(12) United States Patent
Jiang et al.

(10) Patent No.: US 9,395,994 B2
(45) Date of Patent: Jul. 19, 2016

(54) EMBEDDED BRANCH PREDICTION UNIT

(75) Inventors: Xiaowei Jiang, Hillsboro, OR (US);
Srihari Makineni, Portland, OR (US);
Zhen Fang, Portland, OR (US); Dmitri Pavlov, St. Petersburg (RU); Ravi Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 13/992,723

(22) PCT Filed: Dec. 30, 2011

(86) PCT No.: PCT/US2011/068027
§ 371 (c)(1),
(2), (4) Date: Jun. 8, 2013

(87) PCT Pub. No.: WO2013/101152
PCT Pub. Date: Jul. 4, 2013

(65) Prior Publication Data
US 2014/0019736 A1    Jan. 16, 2014

(51) Int. Cl.
*G06F 9/30* (2006.01)
*G06F 9/38* (2006.01)

(52) U.S. Cl.
CPC ................... *G06F 9/3806* (2013.01)

(58) Field of Classification Search
CPC .................................................. G06F 9/3806
See application file for complete search history.

(56) References Cited

U.S. PATENT DOCUMENTS

| | | | | | |
|---|---|---|---|---|---|
| 5,623,614 | A | * | 4/1997 | Van Dyke | G06F 9/3806 712/240 |
| 5,794,063 | A | * | 8/1998 | Favor | G06F 9/30174 712/215 |
| 5,835,967 | A | * | 11/1998 | McMahan | G06F 9/3802 711/213 |
| 5,935,241 | A | * | 8/1999 | Shiell | G06F 9/3804 712/238 |
| 5,964,869 | A | * | 10/1999 | Talcott | G06F 9/3806 712/236 |
| 6,058,447 | A | * | 5/2000 | Holst | G06F 12/0895 710/105 |
| 6,646,899 | B2 | * | 11/2003 | Yiu | G11C 15/04 365/189.05 |
| 6,874,081 | B2 | * | 3/2005 | Kruckemyer | G06F 9/324 711/220 |
| 6,877,085 | B2 | * | 4/2005 | Yeh | G06F 9/3004 712/216 |

(Continued)

FOREIGN PATENT DOCUMENTS

JP    2001521241    11/2001

OTHER PUBLICATIONS

PCT International Search Report and Written Opinion issued in corresponding PCT/US2011/068027 dated Jul. 9, 2012, (9 pages).

*Primary Examiner* — Cheng-Yuan Tseng
(74) *Attorney, Agent, or Firm* — Trop, Pruner & Hu, P.C.

(57) ABSTRACT

In accordance with some embodiments of the present invention, a branch prediction unit for an embedded controller may be placed in association with the instruction fetch unit instead of the decode stage. In addition, the branch prediction unit may include no branch predictor. Also, the return address stack may be associated with the instruction decode stage and is structurally separate from the branch prediction unit. In some cases, this arrangement reduces the area of the branch prediction unit, as well as power consumption.

24 Claims, 5 Drawing Sheets

(56) References Cited

U.S. PATENT DOCUMENTS

| | | | |
|---|---|---|---|
| 6,883,090 B2 * | 4/2005 | Kruckemyer | G06F 9/3842 712/233 |
| 7,100,064 B2 * | 8/2006 | Rogenmoser | G06F 9/3836 712/E9.035 |
| 7,269,714 B2 * | 9/2007 | Yeh | G06F 9/3806 712/214 |
| 7,320,066 B2 * | 1/2008 | Yokoi | G06F 9/3806 712/238 |
| 7,752,426 B2 | 7/2010 | Nye | |
| 7,822,954 B2 | 10/2010 | Ward | |
| 8,250,349 B2 * | 8/2012 | Inoue | G06F 9/30058 712/242 |
| 8,578,141 B2 * | 11/2013 | Jarvis | G06F 9/3806 712/241 |
| 2005/0278517 A1 | 12/2005 | Wong | |
| 2010/0095102 A1 * | 4/2010 | Toyoshima | G06F 8/4442 712/233 |
| 2012/0233442 A1 * | 9/2012 | Shah | G06F 9/3806 712/207 |
| 2012/0297167 A1 * | 11/2012 | Shah | G06F 9/30101 712/202 |

* cited by examiner

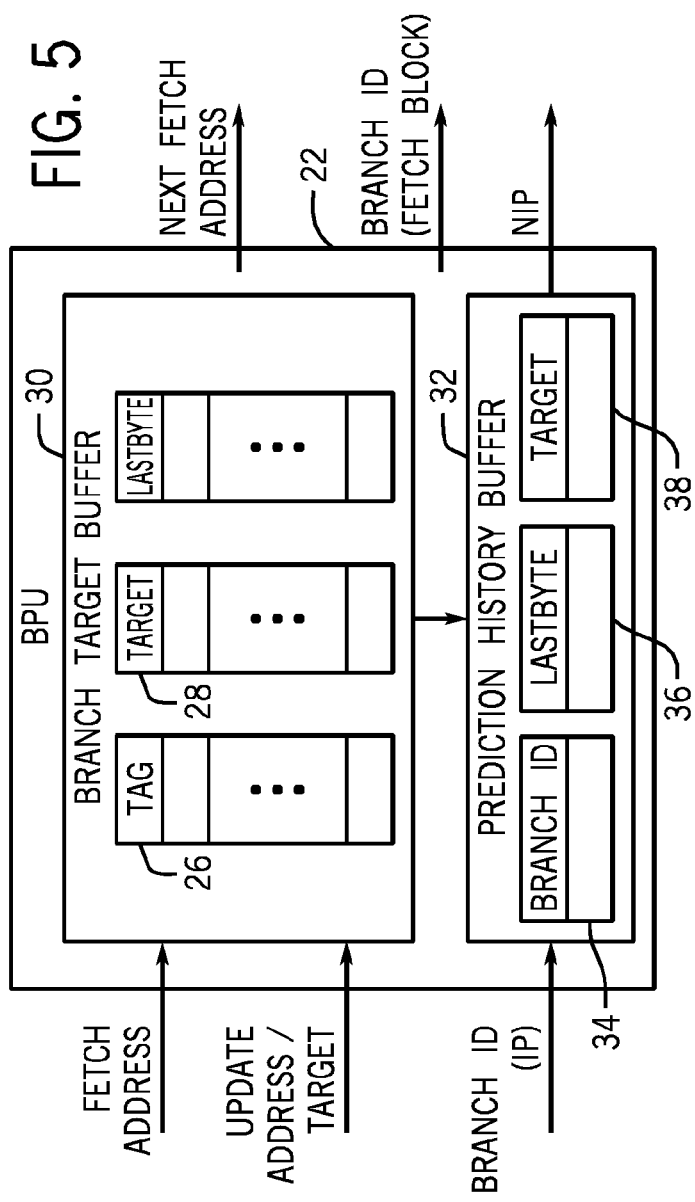

EMBEDDED BRANCH PREDICTION UNIT

BACKGROUND

This relates generally to microprocessors.

One way that microprocessors improve performance is to use a branch prediction unit. A branch prediction unit attempts to determine which way an execution sequence will branch so that instructions may be pre-fetched along the predicted path. This may improve speed and performance.

Typically, microprocessors are designed to prevent a core from executing instructions down the wrong program path. For this reason, branch prediction units include a branch predictor that predicts the direction of a branch and a branch target buffer that predicts the target of a taken branch. For example, a Pentium® processor employs a 256 entry 4-way set associative branch prediction buffer in the decode stage with each entry augmented with a 2-bit branch predictor. The branch predictor is typically implemented using static random access memories. Typically, 16 kilobytes or even larger static random access memory is needed, with the branch predictor and branch target buffer employing roughly half of the branch prediction unit area.

Embedded processors are typically used for microcontrollers, smart phones, tablet computers, and other mobile applications. The branch prediction unit adds a significant amount of power consumption and consumes a significant amount of area on the core in embedded processors. This power and area consumption is more of an issue with relatively small embedded processors.

BRIEF DESCRIPTION OF THE DRAWINGS

Some embodiments are described with respect to the following figures:

FIG. 5 is a schematic depiction of a branch prediction unit according to one embodiment; and FIG. 6 is an instruction fetch buffer according to one embodiment.

DETAILED DESCRIPTION

In accordance with some embodiments of the present invention, a branch prediction unit for an embedded controller may be placed in association with the instruction fetch unit. In addition, the branch prediction unit may include no branch predictor. Also, the return address stack may be associated with the instruction decode stage and is structurally separate from the branch prediction unit. In some cases, this arrangement reduces the area of the branch prediction unit, as well as power consumption.

Figure 1:
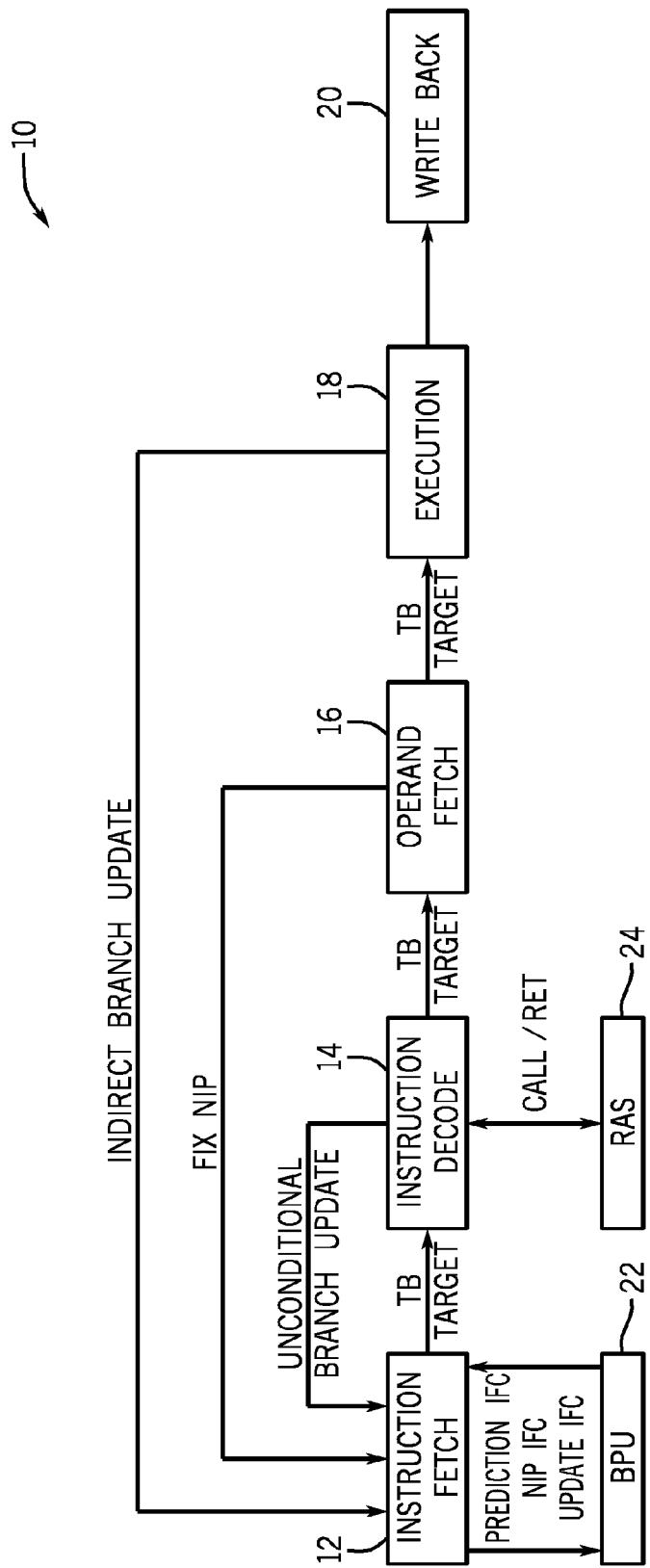
FIG. 1 is a schematic depiction of a processor pipeline in accordance with one embodiment of the present invention.

Referring to FIG. 1, a five stage in order processor pipeline includes an instruction fetch stage 12 coupled to an instruction decode stage 14. Connected to the instruction decode stage 14 is an operand fetch stage 16, in turn coupled to an execution unit 18. The execution unit is coupled to a write back stage 20. The branch prediction unit (BPU) 22 is connected directly to the instruction fetch unit 12 in one embodiment. The branch prediction unit includes a prediction interface, next instruction pointer (NIP) interface, and an update interface.

The instruction fetch 12 sends a taken or not-taken branch direction and a target information to the next stage. The instruction decode stage 14 sends the same information to the operand fetch stage 16 which sends it on to the execution unit 18.

In accordance with some embodiments, no branch predictor is provided in the branch prediction unit 22. This reduces the size of the branch prediction unit. Furthermore, the branch target buffer may be relatively small sized compared to conventional branch target buffers in some embodiments. For example, the branch target buffer may have 32 entries or less and less than 5000 gates.

The inventors of the present invention have determined that, in relatively small sized branch prediction units, the branch predictor is largely ineffective. By eliminating the branch predictor, the branch target buffer can potentially occupy more area to improve its hit ratio, in some embodiments.

Unlike traditional return address stacks (RASs) that sit alongside the target buffer, the return address stack 24 is structurally separated from the main branch prediction unit. Instead, it resides in the instruction decode stage, stores a return address when a call instruction has been decoded and predicts the return target when a ret instruction has been decoded. By structurally separating the RAS from branch prediction unit, branch target buffer entries are not wasted for identifying call and instructions in fetch stage. This further improves the effective size of branch target buffer and increases the accuracy of branch prediction unit in some embodiments. Because the branch prediction unit is implemented in the instruction fetch stage in some embodiments, it guides the paths of the instruction fetch, collaborating with the instruction fetch buffer to keep the program counter up to date.

While an embodiment is shown with a five stage in order processor pipeline, other architectures may also be used.

The branch prediction unit in the instruction fetch stage provides three interfaces in some embodiments. The prediction interface takes as an input the current fetch block's address and predicts the next fetch block's address. The update interface updates the branch prediction unit for resolved branches. The next instruction pointer (NIP) interface takes as an input the current program counter or instruction pointer and provides the next program counter if it has previously made a taken prediction for the fetch block in which the current program counter resides.

With the branch prediction unit sitting in the instruction fetch unit, correct predictions made by the branch prediction unit lead to correct instruction fetch paths. This may avoid extra cycle bubbles or wasting energy and bandwidth to fetch the wrong program path, in some embodiments.

The instruction decode stage 14, operand fetch and execution stages are all responsible for resolving and repairing the branches. Unconditional branches using immediate number operands are resolved and/or fixed in the instruction decode unit. Conditional branches using immediate number operands are resolved or fixed in the operand fetch unit and the rest of the branches are handled in the execution stage.

To determine the correctness of a predicted branch, the predicted direction and target are carried forward in the pipeline stages, as shown in FIG. 1. Once a misprediction is detected, signals are sent to the instruction fetch unit to enable a next instruction pointer fix. The instruction fetch flushes its internal fetch buffer and starts fetching the correct target.

Meanwhile, it sends an update signal to the branch prediction unit to update the branch target buffer.

To reduce power consumption incurred by excessive branch prediction unit updates, only taken branches are updated in the branch target buffer, in some embodiments. Likewise, indirect branches, less likely to be correctly predicted by a relatively small branch target buffer, are not sent to the branch prediction unit for updates, in some embodiments.

Figure 2:
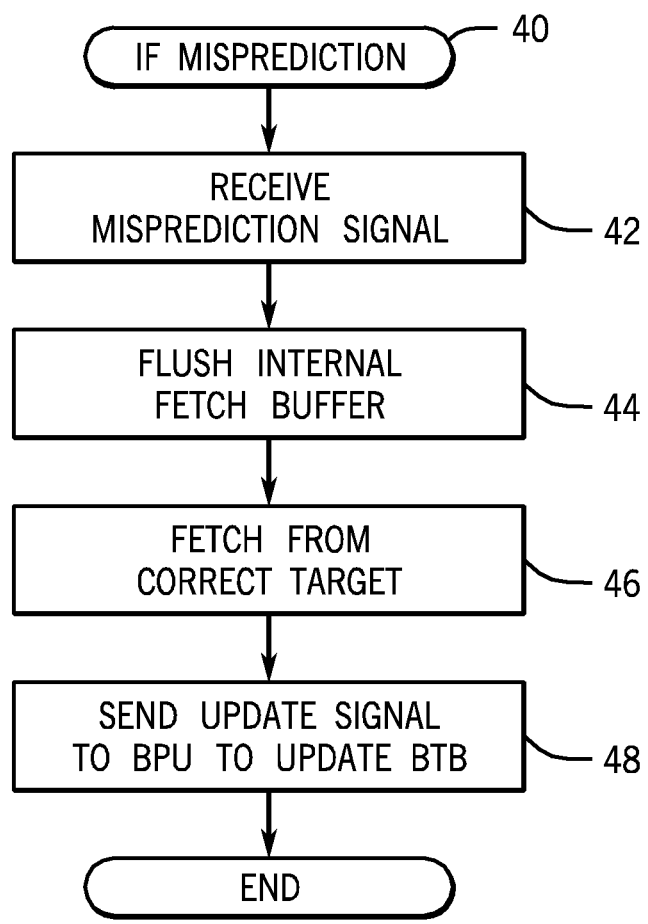
FIG. 2 is a flow chart for an instruction fetch misprediction sequence in accordance with one embodiment of the present invention.

Referring to FIG. 2, handling of a misprediction in the instruction fetch stage is illustrated by the sequence 40. The sequence 40 may be implemented in hardware, software, and/or firmware. In software and firmware embodiments, it may be implemented by computer executed instructions stored in a non-transitory computer readable medium, such as an optical, magnetic, or semiconductor storage.

The sequence 40 begins by receiving the misprediction signal in the instruction fetch unit, as indicated in block 42. Then the instruction fetch unit flushes the internal fetch buffer, as indicated in block 44. Next, the instruction fetch unit starts fetching from the correct target (block 46). Meanwhile, it sends an update signal to the branch prediction unit to update the branch target buffer, as indicated in block 48.

In one embodiment, the return address stack is a size-configurablestack implemented in the instruction decode stage. For call instructions decoded in the instruction decoder, the next program counter of the return address stack gets pushed into the top of the return address stack. For anret instruction decoded in the instruction decoder, the first entry of the return address stack is popped up as a target of the ret. The target is then sent back to the instruction fetch unit for an immediate fix in the same cycle, in some embodiments.

With this embodiment, correct predictions made by the return address stack incur only one cycle bubble. However, this effectively saves space for the branch target buffer to make it more productive for other types of branches.

Figure 3:
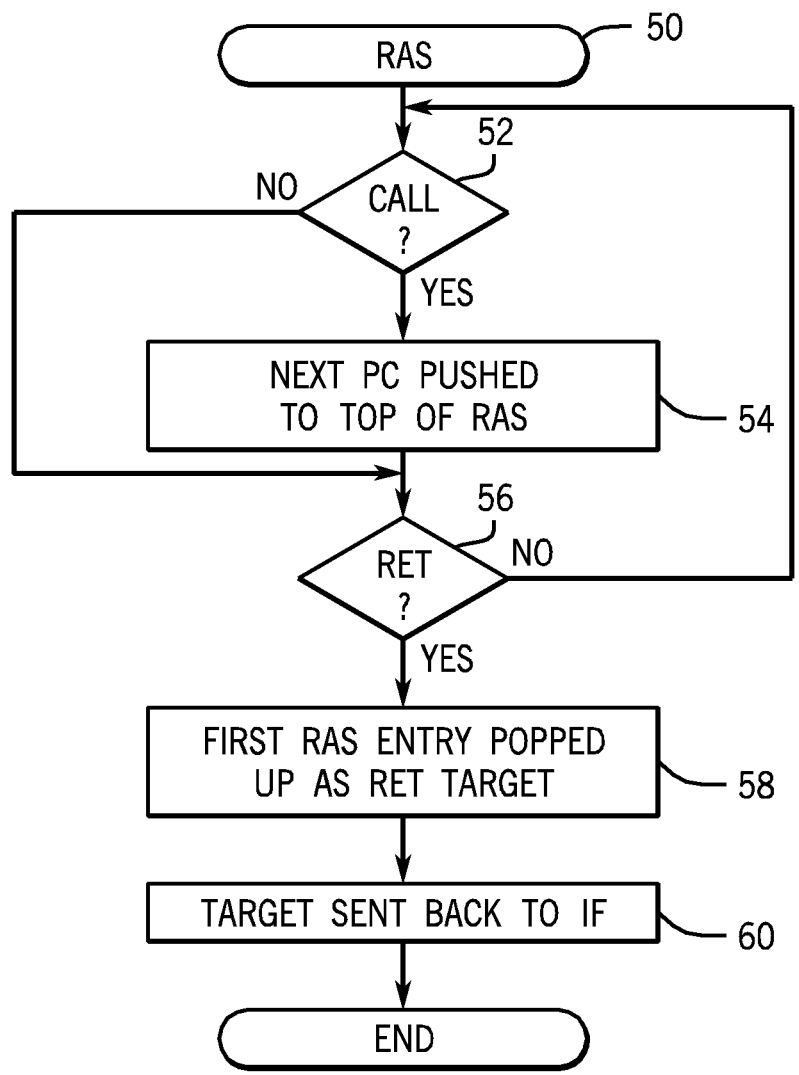
FIG. 3 is a flow chart for a return address stack sequence in accordance with one embodiment of the present invention.

Referring to FIG. 3, a return address stack (RAS) sequence 50 may be implemented in software, firmware, and/or hardware. In software and firmware embodiments it may be implemented by computer executed instructions stored in a non-transitory computer readable medium, such as a magnetic, semiconductor, or optical storage. Typically, the return address stack is implemented in firmware in the embedded controller.

The sequence 50 begins by detecting whether a call instruction has been decoded, as indicated in diamond 52. If so, the next program counter gets pushed into the top of the return address stack, as indicated in block 54. Then a check at diamond 56 determines whether anret instruction was decoded in the instruction decode unit. If so, the first entry of the return address stack is popped up as a target of the ret, as indicated in block 58. Then the target is sent back to the instruction fetch unit for an immediate fix in the same cycle, as indicated in block 60.

The branch prediction unit, shown in FIG. 5, includes a size configurable branch target buffer 30 and a prediction history buffer 32. The branch target buffer 30 may be configurable, for example as a 4, 8, or 16 entry unit and the prediction history buffer 32 may be configured for 2 or 4 entries, in some embodiments. Each cycle of the instruction fetch unit provides the branch prediction unit with the current fetch block address. The branch prediction unit feeds this address into the branch target buffer. If the address hits in the branch target buffer, with the fetch address not going beyond the last byte stored in the branch target buffer entry, the prediction output is a "taken branch." Then, the target address stored in the corresponding branch target buffer entry is provided as the next fetch address to the instruction fetch unit.

The branch target buffer 30 stores tags 26, targets 28 and the last bytes. The prediction history buffer stores a branch identifier 34, last byte 36 and a target 38.

Figure 4:
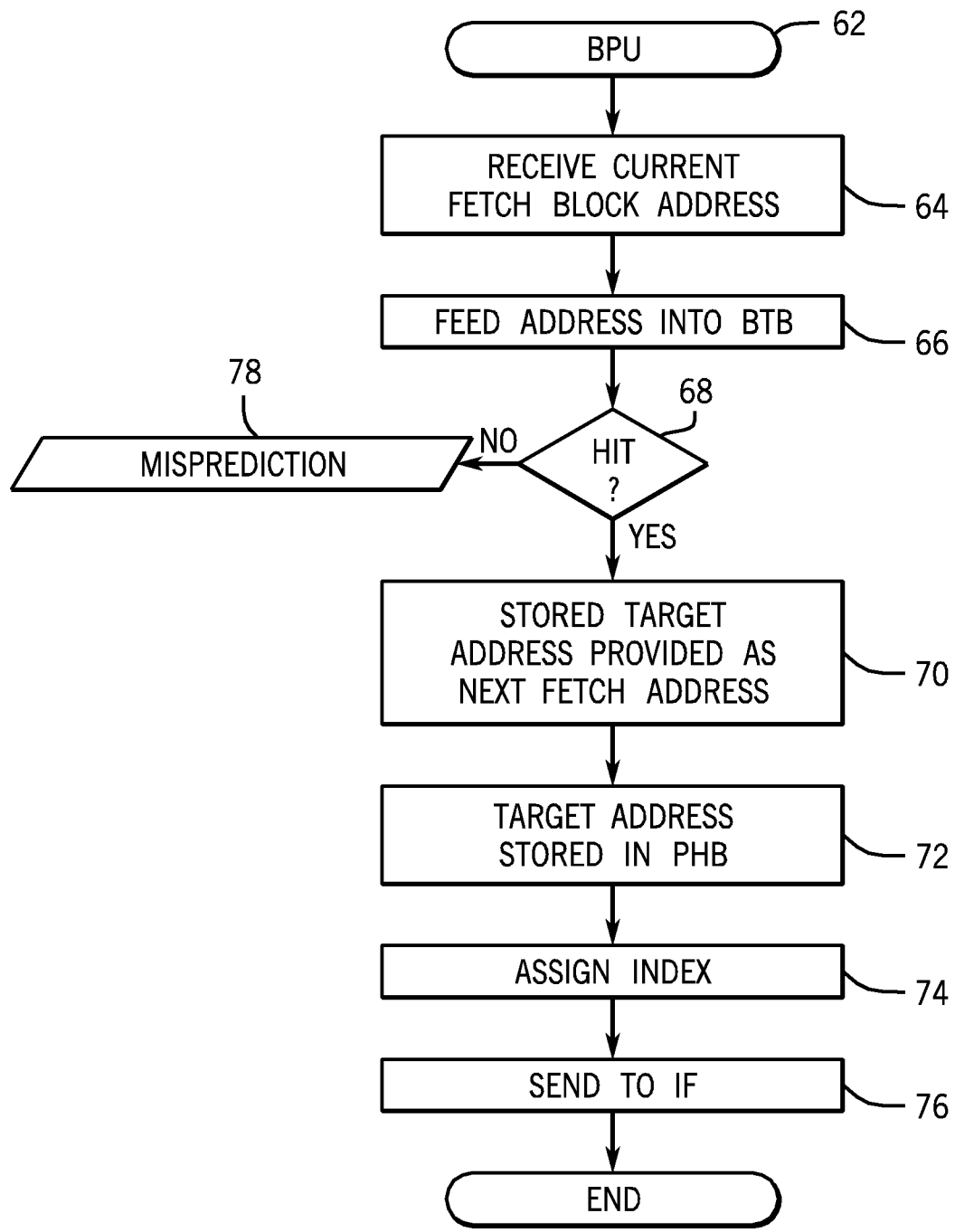
FIG. 4 is a flow chart for a branch prediction unit in accordance with one embodiment of the present invention.

A sequence 62, shown in FIG. 4, may implement the branch prediction unit in some embodiments. The sequence may be implemented in software, firmware, and/or hardware. In software and firmware embodiments, it may be implemented by computer executed instructions stored in a non-transitory computer readable medium, such as a magnetic, optical, or semiconductor storage. Typically, the branch prediction unit sequence 62 is implemented in firmware within the embedded controller core.

The sequence 62 begins by receiving the current fetch block address, as indicated in block 64. Then the address is fed into the branch target buffer, as indicated in block 66.

A check at diamond 68 determines whether there is a hit in the branch target buffer. If so, the prediction output is a taken branch with the target address stored in the corresponding branch target buffer entry being provided as the next fetch address to the instruction fetch unit (block 70). Otherwise, a misprediction is announced at 78.

The instruction fetch unit in the pipeline may fetch a fetch block, such as 8 bytes, every cycle based on addresses provided by the branch prediction unit and store the fetch block in an instruction fetch buffer. Similarly, it also pulls out a few bytes from the instruction fetch buffer every cycle for the instruction length decoder. Once the length of the current instruction is known, the next instruction pointer logic updates the program counter accordingly. Without a branch prediction unit, the next instruction pointer logic simply increments the instruction pointer with the length of the current instruction. With the branch prediction unit, the next instruction pointer logic needs to know if a taken prediction has previously been made by the branch prediction unit for the instruction bytes it is currently dealing with.

For updating the branch prediction unit, the mispredicted branch address, as well as the target address, is sent to the instruction fetch unit when a branch is resolved. The instruction fetch unit then feeds this information into the branch prediction unit as needed.

For every taken prediction the branch prediction unit makes, the target addressand the last byte offset are stored in the prediction history buffer, as indicated in block 72. An index, such as a two-bit branch identifier, is assigned for this prediction for future prediction history buffer lookup, as indicated in block 74. The index is provided along with the predicted fetch block's address to the instruction fetch unit, as indicated in block 76.

The fetch unit associates the branch identifier with the fetch block and keeps it in the instruction fetch buffer, as shown in FIG. 6. Later, when the bytes to be length decoded get popped out, the corresponding branch identifier also pops out from the instruction fetch buffer. This identifier is provided to the branch prediction unit to look up the prediction history buffer. In this way, the next instruction pointer logic can determine the correct next program counter based on the previous prediction that the branch prediction unit has been made.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
providing a branch prediction unit in an instruction fetch stage of a processor pipeline, the instruction fetch stage further including an instruction fetch unit, the branch prediction unit including a branch target buffer having a plurality of entries to store a tag, a target address and last byte information, the branch prediction unit further including a prediction history buffer having a plurality of entries to store a branch identifier, last byte information, and a target address, wherein the branch prediction unit is to provide an index to the instruction fetch stage to enable the instruction fetch stage to use the index to lookup the prediction history buffer; and
providing a return address stack in an instruction decode stage of the processor pipeline, the instruction decode stage coupled to an output of the instruction fetch stage and including an instruction decode unit and the return address stack, the return address stack structurally separated from the branch prediction unit.

2. The method of claim 1 including forming the branch target buffer with 32 entries or less.

3. The method of claim 2 wherein only branches that are taken are to be updated in the branch target buffer.

4. The method of claim 3 wherein indirect branches are not to be sent to the branch prediction unit for update.

5. The method of claim 1 including pushing a next program counter onto a top of the return address stack for call instructions decoded in the instruction decode unit.

6. The method of claim 1 including popping up a first entry of the return address stack for a ret instruction decoded in the instruction decode unit.

7. The method of claim 6 including sending a target back to the instruction fetch stage for an immediate fix in the same cycle.

8. The method of claim 1 including making a branch target buffer size configurable.

9. The method of claim 1 including providing the prediction history buffer in the branch prediction unit and providing an instruction fetch buffer for next instruction pointer logic.

10. A non-transitory computer readable medium storing instructions to enable a processor to perform a method comprising:
providing a branch prediction unit in an instruction fetch stage of a processor pipeline, the instruction fetch stage further including an instruction fetch unit, the branch prediction unit including a branch target buffer having a plurality of entries to store a tag, a target address and last byte information, the branch prediction unit further including a prediction history buffer having a plurality of entries to store a branch identifier, last byte information, and a target address, wherein the branch prediction unit is to provide an index to the instruction fetch stage to enable the instruction fetch stage to use the index to lookup the prediction history buffer; and
providing a return address stack in an instruction decode stage of the processor pipeline, the instruction decode stage coupled to an output of the instruction fetch stage and including an instruction decode unit and the return address stack, the return address stack structurally separated from the branch prediction unit.

11. The medium of claim 10 wherein only branches that are taken are updated in the branch target buffer.

12. The medium of claim 11 wherein indirect branches are not sent to the branch prediction unit for update.

13. The medium of claim 10 including pushing a next program counter onto a top of the return address stack for call instructions decoded in the instruction decode unit.

14. The medium of claim 10 including popping up a first entry of the return address stack for a ret instruction decoded in the instruction decoder.

15. The medium of claim 10 including making a branch target buffer size configurable.

16. The medium of claim 10 including providing the prediction history buffer in the branch prediction unit and providing an instruction fetch buffer for next instruction pointer logic.

17. A processor comprising:
an instruction fetch stage including an instruction fetch unit and a branch prediction unit including a branch target buffer having a plurality of entries to store a tag, a target address and last byte information, the branch prediction unit further including a prediction history buffer having a plurality of entries to store a branch identifier, last byte information, and a target address, wherein the branch prediction unit is to provide an index to the instruction fetch stage to enable the instruction fetch stage to use the index to lookup the prediction history buffer; and
an instruction decode stage coupled to an output of the instruction fetch stage and including an instruction decode unit and a return address stack for the instruction decode unit, the return address stack structurally separated from the branch prediction unit.

18. The processor of claim 17, said branch target buffer having 32 entries or less.

19. The processor of claim 17 wherein only branches that are taken are to be updated in the branch target buffer.

20. The processor of claim 19 wherein indirect branches are not to be sent to the branch prediction unit for update.

21. The processor of claim 17 said instruction decode unit to push a next program counter onto a top of the return address stack for call instructions.

22. The processor of claim 17 said instruction decode unit to pop up a first entry of the return address stack for a ret instruction decoded.

23. The processor of claim 22 said branch prediction unit to send a target back to the instruction fetch stage for an immediate fix in the same cycle.

24. The processor of claim 17 wherein the instruction fetch unit further includes an instruction fetch buffer to store a branch identifier and a fetch block.

* * * * *